(12) United States Patent
Brink et al.

(10) Patent No.: US 12,560,706 B2
(45) Date of Patent: Feb. 24, 2026

(54) NAVIGATION SYSTEM FOR UNDERWATER VEHICLES

(71) Applicant: FRAUNHOFER-GESELLSCHAFT ZUR FOERDERUNG DER ANGEWANDTEN FORSCHUNG E.V., Munich (DE)

(72) Inventors: Gunnar Brink, Karlsruhe (DE); Edwin Devassykutty, Karlsruhe (DE); Christian Langen, Karlsruhe (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/438,890

(22) Filed: Feb. 12, 2024

(65) Prior Publication Data

US 2024/0183977 A1 Jun. 6, 2024

Related U.S. Application Data

(63) Continuation of application No. 18/166,666, filed on Feb. 9, 2023, now Pat. No. 11,899,104, which is a (Continued)

(30) Foreign Application Priority Data

Apr. 28, 2017 (DE) .......................... 102017207231.8

(51) Int. Cl.
*G01S 15/00* (2020.01)
*B63B 22/18* (2006.01)
(Continued)

(52) U.S. Cl.
CPC .............. *G01S 15/00* (2013.01); *B63B 22/18* (2013.01); *B63G 8/38* (2013.01); *G05D 1/0206* (2013.01);
(Continued)

(58) Field of Classification Search
CPC .. G01S 15/00; G01S 2201/07; G01S 2201/08; G01S 2205/04; B63B 22/18;
(Continued)

(56) References Cited

U.S. PATENT DOCUMENTS 3,860,900 A    1/1975   Scudder
4,903,243 A *   2/1990   Turner, Jr. .............. G01S 13/74
                                     367/2

(Continued)

FOREIGN PATENT DOCUMENTS

CN    102843174 A    12/2012
FR    2982375 A1    5/2013
(Continued)

OTHER PUBLICATIONS

Heyser, R.C. "Time Delay Spectrometry: An Anthology of the Works of Richard C. Heyser on Measurement, Analysis, and Perception." Audio Engineering Society, New York, 1988. Retrieved from the Internet: http://www.aes.org/technical/documents/openaccess/AES_TimeDelaySpectrometry.pdf.
(Continued)

*Primary Examiner* — Rodney A Butler
(74) *Attorney, Agent, or Firm* — Perry + Currier Inc.

(57) ABSTRACT

Embodiments of the present invention provide a navigation system which, on the one hand, is arranged on sides of the underwater vehicle/AUV and, on the other hand, includes a surface transmitter as a counterpart. The two units communicate with each other such that the surface transmitter emits its signal directed to the position of the underwater vehicle
(Continued)

and/or that the surface transmitter follows the underwater vehicle to improve the position determination capability.

6 Claims, 6 Drawing Sheets

Related U.S. Application Data continuation of application No. 16/664,781, filed on Oct. 25, 2019, now Pat. No. 11,681,041, which is a continuation of application No. PCT/EP2018/060959, filed on Apr. 27, 2018.

(51) Int. Cl.

| | |
|---|---|
| *B63G 8/38* | (2006.01) |
| *G05D 1/00* | (2006.01) |
| *G05D 1/02* | (2020.01) |
| *G05D 1/06* | (2006.01) |
| *G05D 1/69* | (2024.01) |
| *G05D 1/692* | (2024.01) |
| *B63G 8/00* | (2006.01) |

(52) U.S. Cl.
CPC ............. *G05D 1/0692* (2013.01); *G05D 1/69* (2024.01); *G05D 1/692* (2024.01); *B63G 2008/004* (2013.01); *G01S 2201/07* (2019.08); *G01S 2201/08* (2019.08); *G01S 2205/04* (2020.05)

(58) Field of Classification Search
CPC .. B63G 8/38; B63G 2008/004; G05D 1/0206; G05D 1/0692; G05D 1/69; G05D 1/692
See application file for complete search history.

(56) References Cited

U.S. PATENT DOCUMENTS

| | | | | |
|---|---|---|---|---|
| 5,119,341 | A | 6/1992 | Youngberg | |
| 5,331,602 | A * | 7/1994 | McLaren | ............... H04B 11/00 367/134 |
| 7,054,226 | B1 | 5/2006 | Hickling | |
| 8,009,516 | B2 | 8/2011 | Crowell | |
| 2006/0068719 | A1 * | 3/2006 | Hairapetian | ......... H04B 7/0632 455/69 |
| 2008/0165617 | A1 | 7/2008 | Abbot et al. | |
| 2010/0159827 | A1 * | 6/2010 | Rhodes | ................. H04B 13/02 455/40 |
| 2010/0302901 | A1 * | 12/2010 | Welker | ................. G01V 1/3843 367/21 |
| 2012/0167814 | A1 | 7/2012 | Kalwa | |
| 2016/0272291 | A1 | 9/2016 | Outa et al. | |

FOREIGN PATENT DOCUMENTS

| | | | |
|---|---|---|---|
| WO | WO-2012037174 A2 | 3/2012 | |
| WO | WO-2013068658 A1 * | 5/2013 | ............. B63C 11/02 |
| WO | WO-2013128188 A1 | 9/2013 | |
| WO | WO-2014095854 A1 | 6/2014 | |

OTHER PUBLICATIONS

Thomas, Hubert G. "Gib buoys: an interface between space and depths of the oceans." Proceedings of the 1998 Workshop on Autonomous Underwater Vehicles (Cat. No. 98CH36290).(pp. 181-184) IEEE, 1998.

Tan, Hwee-Pink, et al. "A survey of techniques and challenges in underwater localization." Ocean Engineering 38.14-15 (2011): 1663-1676.

Yan, Weisheng, et al. "Optimal distance between mobile buoy and target for moving long baseline positioning system." The Journal of Navigation 68.4, doi:10.1017/S0373463315000077, ISSN 0373-4633, (2015): 809-826.

ISA/EP, International Search Report and Written Opinion, Aug. 16, 2018, re PCT International Patent Application No. PCT/EP2018/060959.

WIPO/IB, International Preliminary Report on Patentability, Nov. 7, 2019, re PCT International Patent Application No. PCT/EP2018/060959.

* cited by examiner

20

20'

40"

41'

40'''

47'''

41'''

NAVIGATION SYSTEM FOR UNDERWATER VEHICLES

CROSS-REFERENCE TO RELATED APPLICATIONS

This application is a continuation of copending U.S. patent application Ser. No. 18/166,666, filed Feb. 9, 2023, which in turn is a continuation of U.S. patent application Ser. No. 16/664,781, filed Oct. 25, 2019, which in turn is a continuation of copending International Application No. PCT/EP2018/060959, filed Apr. 27, 2018, all of which are incorporated herein by reference in their entirety, and additionally claims priority from German Application No. 10 2017 207 231.8, filed Apr. 28, 2017, which is also incorporated herein by reference in its entirety.

FIELD

Embodiments of the present invention relate to a navigation system for (autonomous) underwater vehicles, a surface transmitter of the navigation system and a corresponding navigation method. Embodiments relate to a recovery apparatus including a surface transmitter.

BACKGROUND

Deep-sea vehicles and autonomous underwater vehicles (AUVs) in particular have limited fuel and battery supplies, respectively. Every autonomous vehicle, no matter whether it is a flying drone, vehicle, boat or diving robot, usually needs three data sources for navigation.

First, there is usually a vehicle model that predicts how the actions of propulsion and control/rowing will affect the direction of motion and speed of motion.

Secondly, there is usually an inertial measurement unit (IMU) with accelerometers and a compass (magnetic, gyro compass, optical gyro or Foucault's pendulum). This IMU measures the acceleration and the direction of motion.

As the IMU has a high drift, the same usually has to be supported at least every 10 seconds by other positioning methods. In the open air, satellite-based navigation such as GPS, GLONASS or Galileo (GNSS in general) can be used for this.

Kalman filters or Bayesian inference or other methods are used to fuse the different data and use them for control.

Underwater there is no possibility for satellite-based navigation or satellite-based geo-referencing, since the radio signals of the satellites do not function in or under water. The depth (z-direction) can be easily determined by barometry (about 0.1 bar per meter of water depth). The determination of position and motion in x- and y-direction, i.e. parallel to the water surface, is difficult.

As soon as the deep-sea vehicles can detect the bottom, Doppler Velocity Log or Simultaneous Localization and Mapping can be used to determine the position. However, this is at least not possible during the dive trip, which can last several hours.

There are numerous approaches in the conventional technology how underwater navigation can still be achieved. Three of these approaches are described below.

One approach is the long-baseline method. For this purpose, several beacons are placed on the bottom of the sea in the survey area, for example at a distance of up to 4 km from each other. In the simple variant, the same transmit sonar signals, e.g. as pings. The position of the beacons is measured with one or more surface boats, which can easily determine their position with satellite-based navigation, and which have a sonar receiver, e.g. via time-of-flight of the ping signals.

During the actual journey of the underwater vehicles, the same can then determine their position relative to the beacons by measuring the sonar signals, for example via time-of-flight, and can thus compensate for the lack of satellite-based navigation. The distance between the individual transmitters (beacons) and the underwater vehicle can then be determined on the basis of the determined runtime by the vehicle under water or on the basis of the signals received by the vehicle under water, so that the position of the underwater vehicle can be determined by means of triangulation. This position determination via triangulation primarily enables obtaining a relative distance to the individual beacons, whereby the absolute position can be determined by the fact that the positions of the beacons were measured in advance and are therefore known.

After the mission, each beacon reduces its specific weight, for example by dropping a drop weight, and rises to the sea surface where the same can be collected.

This method can be so precise that position determinations with an accuracy of significantly more than one meter can be obtained. The disadvantage is that placing and collecting the beacons is expensive. Also the calibration of the beacons takes time. Often, a whole day is needed as working time per measurement for the calibration of the beacons before the actual diving mission.

Another method that does not entail beacons to be placed, measured and collected is the ultra-short baseline method. Here, the submersibles transmit acoustic signals, e.g. pings. A surface vehicle has a sensor that consists of at least two acoustic receivers a few centimeters apart. These receivers determine the phase shift of the acoustic waves and thus the angle at which the submersibles measure themselves in relation to the surface vehicles calibrated by satellite-based navigation. Angular resolution of up to $0.05°$ can be obtained, in practice, currently, a resolution of up to $0.2°$ is obtained due to ambient noise, wave motion and other effects. Multiplying the sinus of $0.2°$ by several thousand meters of sea depth results in inaccuracies of several meters. The determined location of the submersible is transmitted from the surface vehicle to the submersible via an additional acoustic modem or via the USBL modem itself. In water, the speed of sound is about 1.5 km/second. Despite the high speed of sound, latency times of several seconds result under water, especially in the deep sea.

Another variant used is the so-called GIB concept (GPS Intelligent Buoys). GIB systems are inverted long baseline applications with acoustic positioning device where the acoustic receivers are installed on buoys equipped with satellite navigation. These float either in the water or are anchored there and are localized with a time-of-flight technology. Often, several GIBs are used over a measuring area, with accuracies from a few centimeters up to one meter being possible in real time.

Since the position is determined primarily on the receiver side, i.e. on the surface, this system can only be used meaningfully for AUVs if the position is transmitted to the AUV. This results in a latency. Even if the used buoys do not have to be anchored under water at great expense and their position determines itself during operation, the buoys still have to be collected again after use.

In summary, practically all systems available on the market have disadvantages in terms of effort during use, accuracy and/or the resulting latency. There is therefore a need for an improved approach.

SUMMARY

According to an embodiment, a surface transmitter for an underwater vehicle movable in the three-dimensional underwater space in the x-, y- and z-direction may have: a controller for moving the surface transmitter in the x- and y-direction on the water surface; a receiver for receiving position information for the position of the underwater vehicle; a control computer for controlling the controller, wherein the control computer is configured to control the surface transmitter such that the surface transmitter follows the x- and y-direction of the underwater vehicle in the x- and y-direction, wherein the surface transmitter includes a transmitting apparatus configured to emit a first signal such that a runtime of the first signal can be determined by the underwater vehicle; wherein the control is performed such that the surface transmitter is positioned substantially perpendicularly above the underwater vehicle to emit the first signal substantially perpendicularly in the direction of the position of the underwater vehicle; or wherein the transmitting unit transmits the first signal directed in the direction of the position of the underwater vehicle.

According to another embodiment, a surface transmitter movable in the three-dimensional underwater space in the x-, y- and z-direction may have: a receiver for receiving position information for the position of the underwater vehicle; and a transmitting unit that is configured to emit a first signal such that a runtime of the first signal can be determined by the underwater vehicle, wherein the transmitting unit transmits the first signal directed in the direction of the position of the underwater vehicle.

According to another embodiment, a method for controlling a surface transmitter with a controller configured for moving the surface transmitter in the x- and y-direction on the water surface may have the steps of: transmitting a first signal such that the first signal is directed in the direction of the position of the underwater vehicle and that a runtime of the first signal can be determined by the underwater vehicle; receiving position information for the position of an underwater vehicle movable in the three-dimensional underwater space in the x-, y- and z-direction; and controlling the controller of the surface transmitter such that the surface transmitter follows the x- and y-direction of the underwater vehicle in the x- and y-direction, wherein the control is performed such that the surface transmitter is positioned substantially perpendicularly above the underwater vehicle to emit the first signal substantially perpendicularly in the direction of the position of the underwater vehicle; or wherein transmitting the first signal is performed directed in the direction of the position of the underwater vehicle.

Another embodiment may have a non-transitory digital storage medium having a computer program stored thereon to perform the method for controlling a surface transmitter with a controller configured for moving the surface transmitter in the x- and y-direction on the water surface, the method having the steps of: transmitting a first signal such that the first signal is directed in the direction of the position of the underwater vehicle and that a runtime of the first signal can be determined by the underwater vehicle; receiving position information for the position of an underwater vehicle movable in the three-dimensional underwater space in the x-, y- and z-direction; and controlling the controller of the surface transmitter such that the surface transmitter follows the x- and y-direction of the underwater vehicle in the x- and y-direction, wherein the control is performed such that the surface transmitter is positioned substantially perpendicularly above the underwater vehicle to emit the first signal substantially perpendicularly in the direction of the position of the underwater vehicle; or wherein transmitting the first signal is performed directed in the direction of the position of the underwater vehicle, when said computer program is run by a computer.

Embodiments of the present invention provide a navigation system which, on the one hand, is arranged on sides of the underwater vehicle/AUV and, on the other hand, comprises a surface transmitter as a counterpart. The two units communicate with each other such that the surface transmitter emits its signal directed to the position of the underwater vehicle and/or that the surface transmitter follows the underwater vehicle to improve the position determination capability.

According to one aspect, the surface transmitters are those which also include control means such as a drive unit and a rudder unit, as well as a control computer. This control computer receives information about the current position of the AUV from a position calculation unit on the AUV side in order to control the control means (motor, rudder system) based thereon such that the surface transmitter actively follows the underwater vehicle in y- and x-direction on the water surface; a variant would be that the surface transmitter is actively positioned above, e.g. almost perpendicularly above the underwater vehicle. This has the advantage that even if the surface currents are different than the currents under water or the desired direction of motion of the AUV, the transmitter is correctly positioned (e.g. perpendicular or at a predetermined angle) with respect to the AUV and the AUV cannot come out of reach of the same.

In addition or alternatively, according to a further aspect, the surface transmitter (above the AUV) can actively direct its sound lobe (first signal) to the AUV, wherein this directivity is possible, for example, by an adjustable array, a movable transmitter or a (downward directed, pivotable) horn. The position information received from the AUV is used to align the sound signal lobe. This results in an efficient signal radiation characteristic.

Both aspects are based on the knowledge that underwater navigation can be improved by simply positioning the transmitter(s) (without anchoring) on the water surface when the same follow the underwater vehicle in real or by signal bearing. For this, the same receive corresponding position information, e.g. relative position with respect to the surface transmitter, from the underwater vehicle, based on which the transmitter is aligned or moved. The correct positioning of the transmitter, especially perpendicular positioning, as well as the directional radiation has the advantage that effects such as so-called multi-path signals due to reflections or refractions on the water layer are minimized. Furthermore, there is an additional advantage, namely that the signal energy can be smaller, since the distances are also minimal.

According to a further aspect, a receiver of the underwater vehicle is provided. The same includes the actual receiver unit, e.g. for acoustic signals or sonar signals, as well as a runtime calculator. The receiver also includes either an internal or external position calculation unit. The receiver is configured to receive at least a first signal from a first surface transmitter (e.g. a buoy with GPS). The first signal is designed such that the same can be evaluated with regard to its runtime in order to determine the corresponding distances to the surface transmitter. The position calculation unit is configured to determine, on the basis of known information about the positions of the surface transmitters and on the basis of the determined distance, the positions of the autonomous underwater vehicle in the three-dimensional underwater space (x-y- and z-direction). The receiver further comprises a transmitter configured to send a control signal, e.g. in the form of position information, to the surface transmitter, so that the surface transmitter can follow the x- and y-direction of the underwater vehicle in x- and y-direction or so that the first surface transmitter transmits the signal to be transmitted directed in the direction of the position of the underwater vehicle.

According to embodiments, the position information determined by the receiver unit or the position calculation unit is provided to the surface transmitter, e.g. via radio or an acoustic modem.

When calculating the position, according to embodiments, a second signal from a second surface transmitter (to determine a second distance) or additional information, such as (barometrically determined) depth information or information about the current radiation angle of the surface transmitter, can also be used.

Embodiments of this aspect are based on the knowledge that the surface vehicle described above, which forms one of the essential parts of the overall system described herein, or that the navigation system as such needs position information with regard to the position of the underwater vehicle in order to ensure overall functionality. This approach also eliminates the need for expensive installation and calibration processes, as well as high positioning accuracy. In other words, this means that the presented concept uses a kind of long baseline method (including the advantages of high precision), whereby the transmitters do not have to be fixed at a position, since they determine their position themselves and make it available to the actual position computer. If the position calculation unit is located directly on the AUV, latency can also be avoided.

As indicated above, according to embodiments, each surface transmitter includes a GNSS unit, such as a GPS receiver, to autonomously determine its position. According to a further embodiment, this position information can be transmitted via the transmitted sound signal or a parallel signal, so that in the end the position calculation unit receives the position information. At this point it should be noted that the signals from the surface transmitters (cf. first and second signals) are usually sound signals, as these propagate well under water. For example, it could be a ping, which is then executed such that synchronization is possible. Synchronization can be achieved by adding a timestamp to the ping, or by synchronizing the surface transmitters as well as the receivers of the AUV with high-precision chronometers, wherein then the ping is transmitted at correspondingly regular intervals. As an alternative to a ping, a so-called Time Delay Spectrometry signal can also be used, e.g. according to Richard Heyser. This is a signal in which the frequency is varied accordingly during emission in order to determine the runtime on the basis of the frequency shift.

According to embodiments, the surface transmitter described above is not only a surface transmitter, but integrated into a so-called recovery apparatus for AUV. In inventive applications, AUVs are placed in the water and recovered via their own floating recovery apparatuses, so that a remote-controlled or autonomous recovery apparatus is allocated to each AUV. This recovery apparatus may, for example, have the form of an inflatable boat or of a hull, so that the autonomous underwater vehicle can be received between the two hulls of the hull form and mounted/recovered by means of fasteners (rope system or crane). Since the recovery apparatus includes the surface transmitter, it is no longer needed to place additional buoys for navigation. According to a variant, the recovery apparatus is used either in short-distance operation, i.e. at a short distance, e.g. 10 or 20 km around the mother ship, or in long-distance operation, e.g. at a distance of several 100 km from the coast. The second variant is particularly advantageous, in particular in terms of deployment costs, as the mission can be launched from land without incurring costs for a mother ship and the AUVs and recovery apparatuses of the AUVs, respectively, carry the corresponding navigation system.

Frequently, at least two surface transmitters or even three or four surface transmitters floating on the water surface at a distance of e.g. 100 meters from each other are used. However, this is not a real restriction for practical operation, as several AUVs and thus several recovery apparatuses are usually used in parallel anyway. In this respect, an AUV can receive the first signal from its own recovery apparatus while receiving the second signal from a second recovery apparatus. The reason for this is that several vehicles improve the position determination.

An embodiment provides a navigation system with a receiver unit arranged on the AUV side and at least one surface transmitter.

BRIEF DESCRIPTIONS OF THE DRAWINGS

Embodiments of the present invention will be detailed subsequently referring to the appended drawings, in which.

Figure 3A:
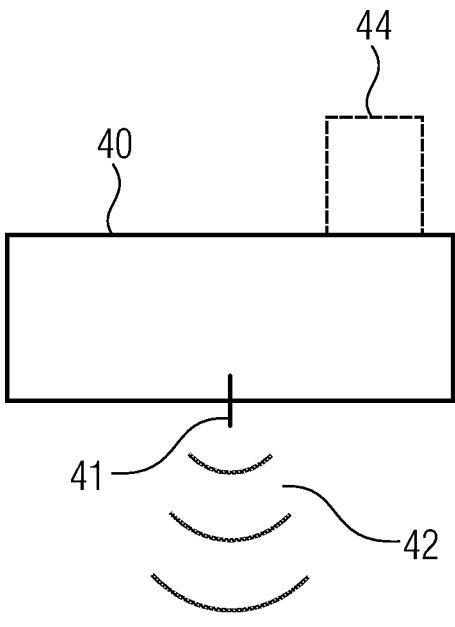
Figure 3B:
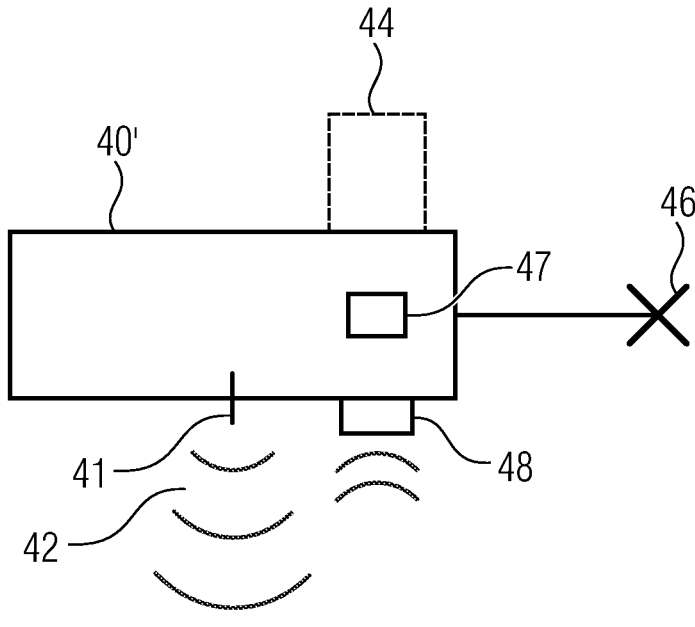
Figure 3C:
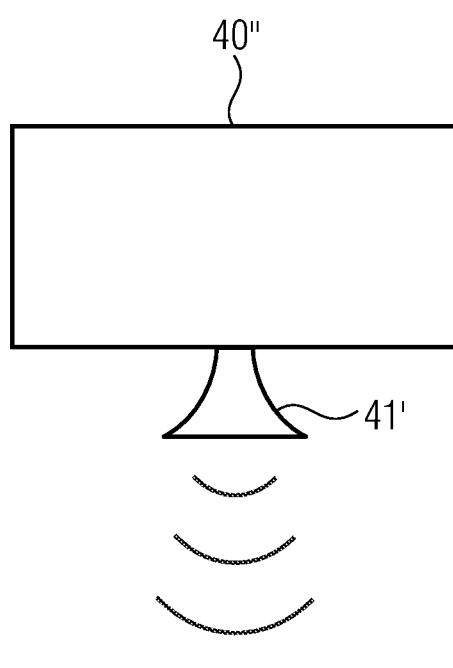
Figure 3D:
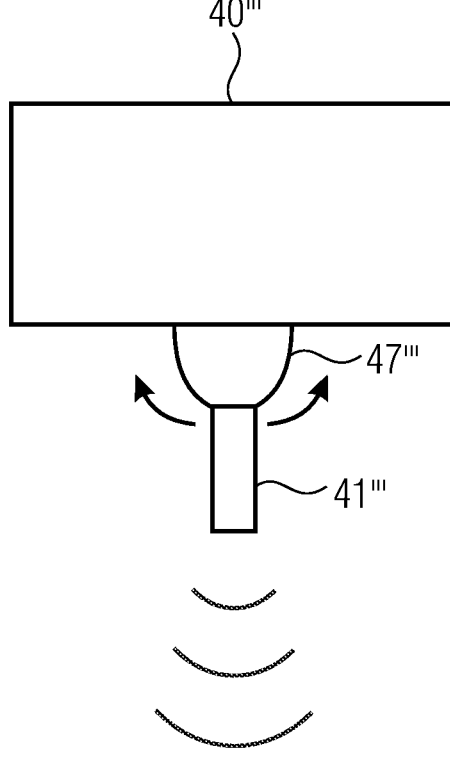
Figure 3E:
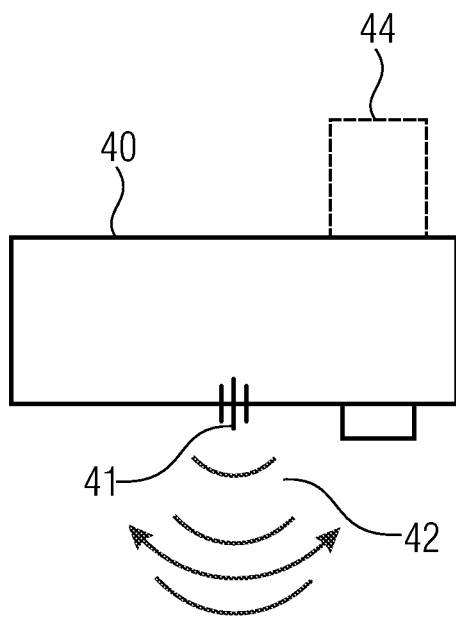
Figure 4:
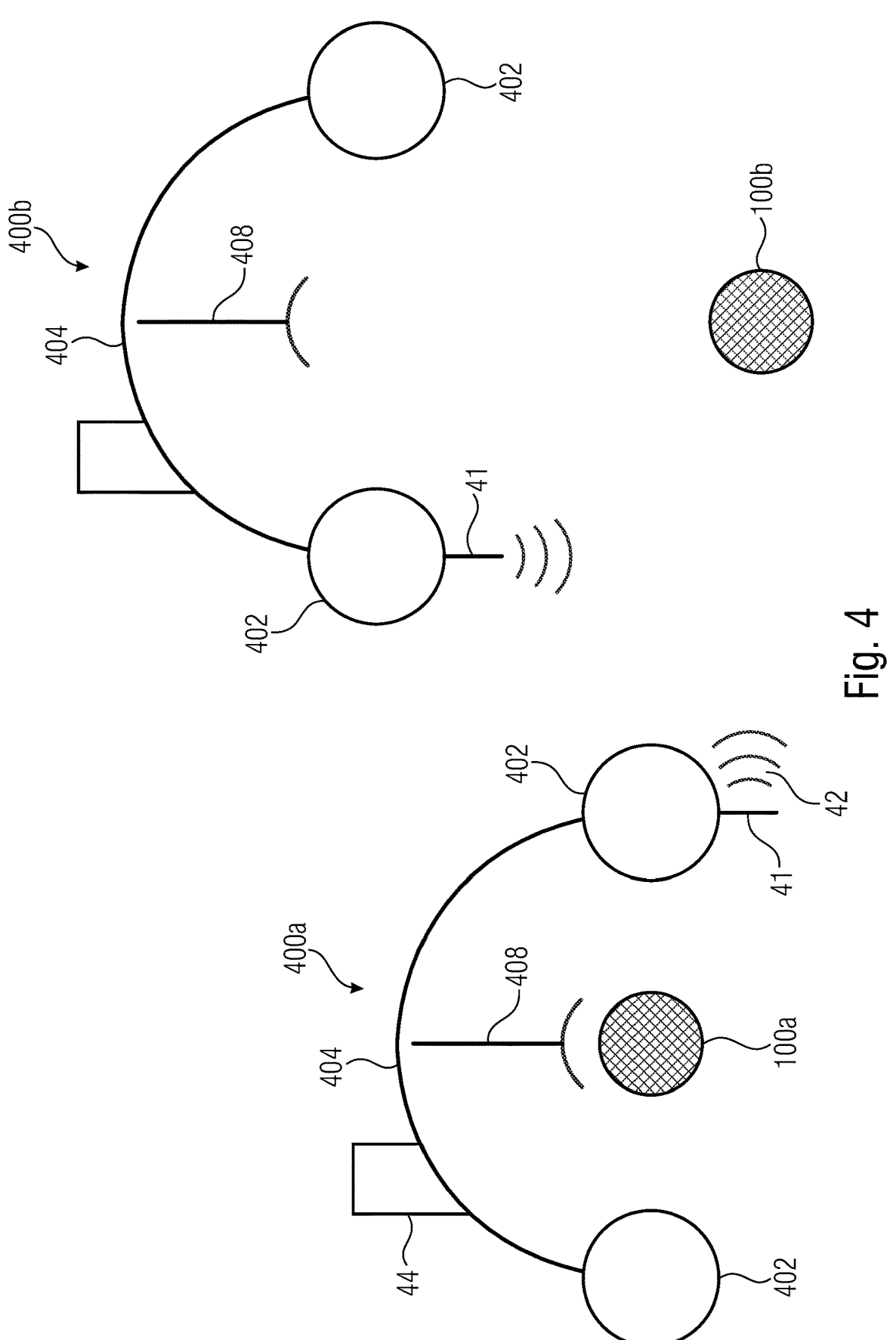

FIGS. 3a, 3b, 3c, 3d, and 3e are schematic representations of the surface transmitter according to further embodiments; and FIG. 4 is a schematic representation of two recovery apparatuses for AUVs with integrated surface transmitter according to an embodiment.

DETAILED DESCRIPTION

Before embodiments of the present invention will be discussed in detail below based on the figures, it should be noted that identical or equivalent elements are provided with identical reference signs, so that the description of them can be applied to each other or is interchangeable.

Figure 1:
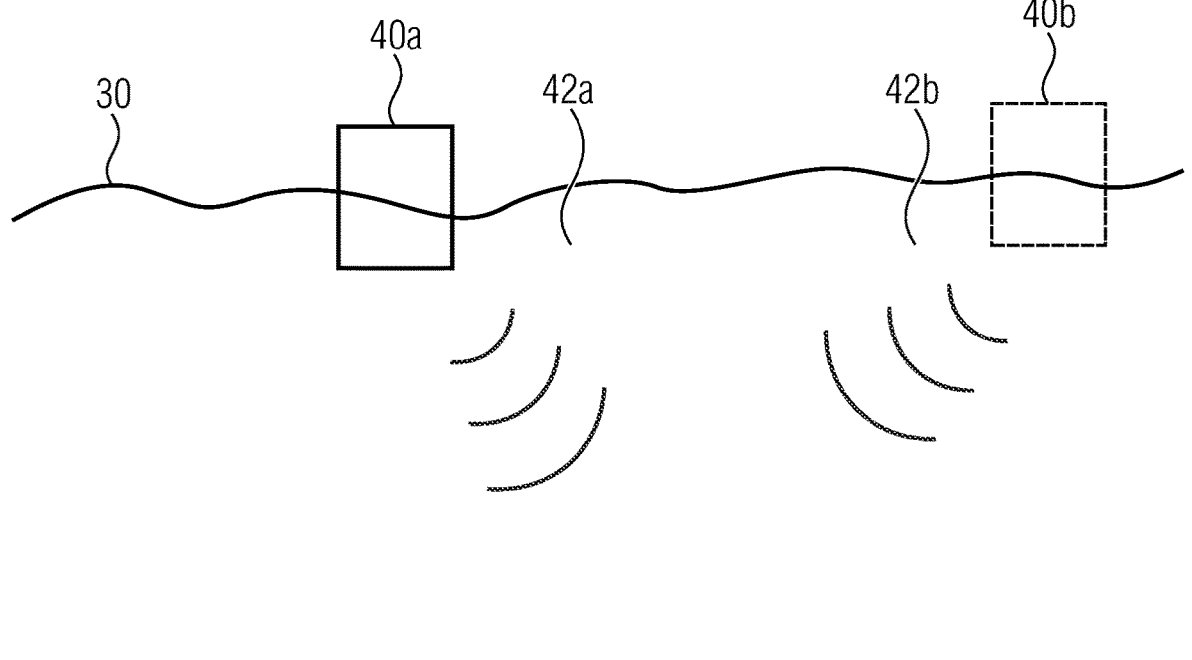
FIG. 1 is a schematic representation of a navigation system including two surface transmitters and an AUV according to an embodiment.
Figure 1:
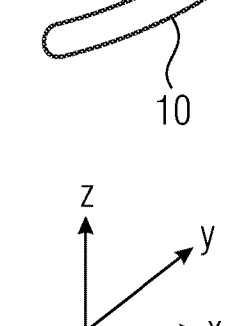

FIG. 1 shows an AUV 10 with a navigation receiver 20. The AUV is located in three-dimensional underwater (cf. x, y, z) below the water surface 30, on which e.g. the two surface transmitters 40a and 40b float, wherein the second transmitter 40b is optional.

Each of the transmitters 40a and 40b emits an associated signal (e.g. an acoustic signal or sonar signal) 42a and 42b directed in the direction of the (known) position of the receiver 20, which then determines the runtime of the signal 42a and 42b and determines, on the basis thereof, the respective distance between the AUV 10 and the transmitter 40a and 40b, respectively. Based on the one or several distances, the position of the AUV 10 in the water relative to the surface transmitters 40a and 40b can be determined by triangulation. As an alternative to the approach with two signals 42a/42b from different directions, it would also be possible to use a signal 42a in combination with additional information, such as (barometrically determined) depth information or information about the current radiation angle of the surface transmitter. If the positions of the surface transmitters 40*a* and 40*b* are known, the absolute position of the AUV 10 can also be determined.

The underwater vehicle 10 transmits the determined absolute or relative position back to the surface transmitter 40*a* or surface transmitter 40*b* in the form of a feedback loop, which then emits the following signals 42*a* or 42*b* to the AUV 10 via a radiation array or another alignable transmitter. It would also be possible for the surface transmitter 40*a* (or 40*b*) to follow the AUV 10 instead of or in addition to the signal direction.

These components involved on the receiver side are explained below with reference to FIG. 2*a* or 2*b*.

Figure 2A:
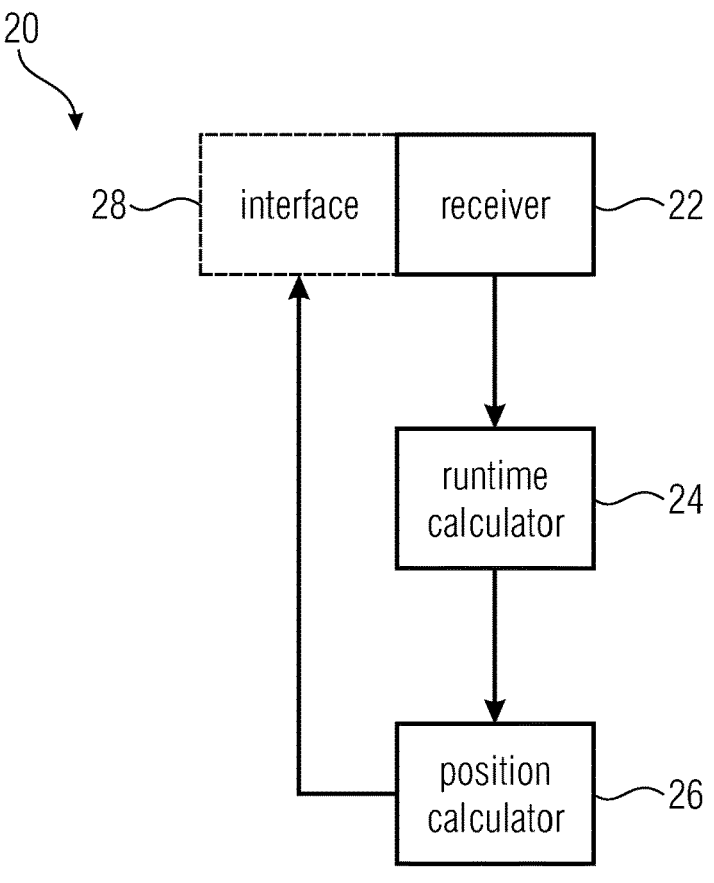
FIGS. 2a and 2b are schematic representations of different variants of the receiver unit arranged on the AUV side according to embodiments.

FIG. 2*a* shows the essential on-board components of the navigation system receiver 20 including the receiver unit 22, the calculation unit 24 for the runtime and position calculation unit 26. The unit 22 receives at least the signals 42*a* (and 42*b*). The signals received by the unit 22 are then evaluated in the unit 24 with regard to their runtime. Synchronicity is advantageous for runtime evaluation.

For this, for example, the unit 24 can be synchronized with the transmitters 40*a* (and 40*b*) in that, for example, all units comprise a highly accurate clock, e.g. a microsystem-manufactured rubidium or caesium atomic clock. In this way, the signals arriving at the submersible are synchronized with the signals 42*a* and 42*b* transmitted by the surface vehicles 40*a* and 40*b* at defined times/regularly. It is important that even after a mission of several hours synchronicity in the microsecond range can still be ensured, as this is the only way to determine the runtime and thus the distance. Alternatively or in addition to the signals 42*a* and 42*b* transmitted at the defined time, signals with a time stamp can also be emitted from the surface vehicles 40*a* and 40*b*, so that synchronization during operation is possible.

This distance is determined separately in unit 24 for signals 42*a* (and 42*b*). This concept is also known as time-of-flight measurement. According to embodiments, additional information, such as the barometrically determined depth, can also be added. Furthermore, it is also conceivable that instead of the two signals 42*a* and 42*b*, a third signal or a third distance is evaluated.

The runtime calculator 24 outputs one or several distances as a result to the position calculator 26, which then primarily determines the relative position of the AUV 10 or, when knowing the positions of the surface transmitters 40*a* and 40*b*, also the absolute position.

Alternatively, it would be possible to determine the relative and absolute underwater position, respectively, as follows: The receiver 20 receives the signal 42*a* via the receiver unit 22 and evaluates the same by means of units 24 and 26 with regard to the distance to the surface vehicle. By knowing the angle used by the surface transmitter 40*a* (additional information), the position of the AUV 10 can be determined from the position of the surface transmitter 40*a*. The more information is used (one or more transmitters 42*a*/42*b*/ . . . , barometric depth, etc.) and/or the more directional (e.g. narrow sound lobe with aperture angle>20° or 10° the signal 42*a* can be emitted, the more accurate the determination, so that the same is received by the receiver 22. Therefore, continuous matching between the determined underwater position and the direction of radiation (cf. unit 40*a*) is advantageous.

According to another embodiment, the unit 20 can therefore have an interface 28, which, on the one hand, transmits the position calculated by the position computer 26 to external, e.g. to the units 40*a* and 40*b* and/or on the other hand receives the position information of the surface transmitters 40*a* and 40*b*. Since acoustic modems are used under water, the interface 28 can belong to the receiver 22.

With regard to signals 42*a* and 42*b*, it should be noted that these can be ping signals, for example. Ideally, frequencies below 25 kHz should be used, as at higher frequencies the sound absorption in seawater becomes very high due to salts, especially magnesium salts, and the water itself, and can quickly reach several 100 dB/km.

Even if in the above embodiments a ping signal has been assumed, the signal may have a different form. These signals can be transmitted and evaluated according to time delay spectrometry by Richard Heyser. Accordingly, the frequency of the signal is changed in a defined way during transmission. When the transmitters and receivers are synchronized in time, the frequency shift of the received signals can be used to precisely determine their runtime.

If the signal takes a multipath path, for example due to stratifications in the water with different sound velocity, the signal with the highest frequency (which was the fastest) is evaluated. It is easy to determine in the submersible how high the frequency shift is at a given point in time and to specifically suppress multipath reflections by means of a selective filter.

Figure 2B:
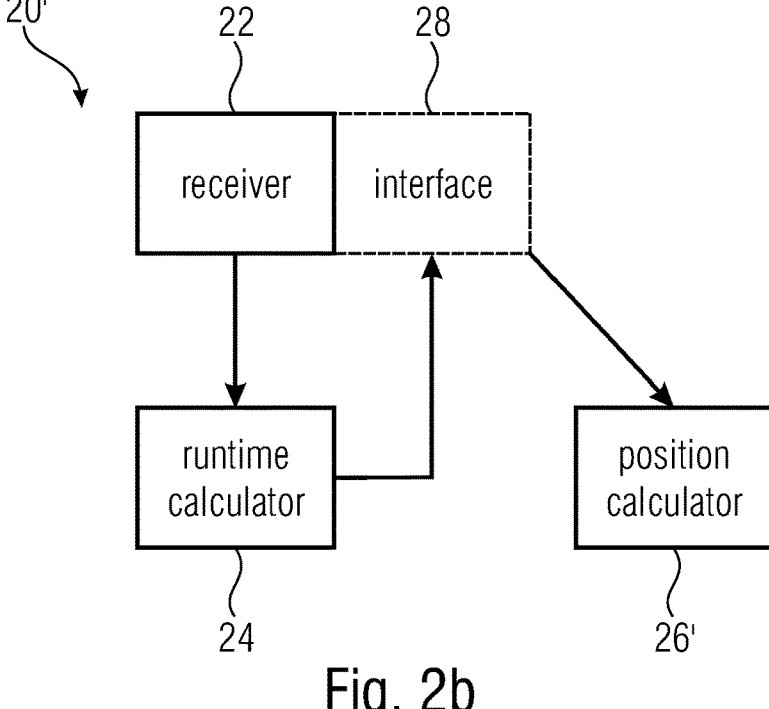

FIG. 2*b* shows another variant of the on-board components of the navigation system 20'. The on-board components 20' include the receiver unit 22 as well as the runtime calculator 24. The position calculator 26' can therefore be arranged externally, e.g. on a surface transmitter, the mother ship or the mainland, and receives the calculated distances or information in this respect from the runtime calculator 24 via a radio link (cf. component 28). With regard to this embodiment 20', it should be noted that although there are still disadvantages with regard to the latency, there are nevertheless advantages with regard to the high precision of the location and the simple installation.

With reference to FIG. 3, some variants of the surface transmitter 40 will be explained.

FIG. 3*a* shows a surface transmitter 40 with the actual underwater transmitter 41 (e.g. an acoustic driver of an underwater or acoustic modem), which emits the signal 42 in a directional manner. The surface transmitter 40 also includes a GNSS Unit 44, such as a GPS receiver, which determines the position of the surface transmitter 40. This position information is made available in the internal or external position calculator (cf. reference number 26 or 26' of FIGS. 2*a* and 2*b*). The information regarding the absolute position of the surface transmitter 40 can, for example, be modulated onto signal 42 or generally be contained by the same.

This simplest surface transmitter may not be optimal in all weather conditions as it may move away from the AUV 10 (see FIG. 1) due to currents. For this reason, according to another embodiment, the surface transmitter can also be actively controlled as shown in FIG. 2*b*.

FIG. 3*b* shows a surface transmitter 40' with at least the actual underwater transmitter head 41, an optional GSS unit 44 and control means 46, e.g. in the form of a propeller in combination with a rudder or pod drive. These control means 46 are controlled by a control computer 47. In the embodiment, the control is performed autonomously such that the surface transmitter 40' is in the vicinity of the AUV 10 (see FIG. 1) or, to be precise, so that the surface transmitter 40' follows the AUV 10 with respect to the x- and y-movement of the same. For this purpose, the surface transmitter 40' can comprise a receiver, such as an underwater receiver (e.g. part of the existing acoustic modem), via which the same receives the position information from the AUV or the position computer 26/26'. The submersibles transmit their position and their current movement to the surface vehicles, e.g. via an acoustic modem. Thus, the latency of the position determination is only half as long for the submersible vehicle than for the surface vehicle. This receiver is provided with the reference number 48.

The surface transmitter 40' is actively moved over the measurement region and is therefore not anchored or drifting passively. This means that the surface transmitter 40' accompanies the underwater vehicle 10 during the mission and drives above the same. The surface vehicles 40' drive perpendicularly above the submersible as far as possible in order to minimize multipath signals by reflection or refraction at water layers.

Another advantage is that the signals can be emitted perpendicularly downwards, which minimizes the signal energy or general losses of the signal. According to embodiments, either a phased array transmitter can be used as transmitter 41, or a suitable horn, as shown in FIG. 3c, for example.

FIG. 3c shows a surface transmitter 40″ with a horn transmitter 41' arranged under water.

FIG. 3d shows a surface transmitter 40″ which is comparable to the surface transmitter 40, but is designed to align the actual underwater transmitter 41″. This can be realized, for example, by a motorized pivot mechanism 47″ with or without directional antenna 41″ (e.g. the horn of FIG. 3c) or also by a transmitter array 41, as shown in FIG. 3e. The alignment depends on the received position information for the underwater vehicle.

FIG. 4 shows two surface transmitters 400a and 400b released in an area of application, wherein ideally four or more of these surface transmitters 400a, 400b are used. In this embodiment, the surface transmitters 400a and 400b are configured as recovery apparatuses, wherein a so-called hull principle with two floating bodies 402 is used, which are connected to each other by an above-water structure 404. The transmitter 41 can, for example, be located at the bottom of the floating body, while the GNSS receiver 44 is located at the above-water structure 404. The above-water structure 404 also collecting means 408 for an AUV 100a to be recovered or released. According to a variant, the recovery apparatus 400a and 400b includes drive means and control means, respectively (not shown).

The concept of this recovery apparatus 400a and 400b with integrated surface transmitter is that the surface vehicles 400a and 400b carry or pull the underwater vehicle 100a and 100b to the site of operation and then release them at the site of operation. The surface vehicles 400a and 400b can operate autonomously and can be released from the mother ship or even from the mainland, for example, thus covering several kilometers or even several 100 kilometers distance without using the battery of the AUV 100a or 100b. Once in the target area, the AUVs 100a or 100b will be dropped or released into the water with the help of the collecting means 408, so that the same can carry out the mission. When the mission is complete, the AUVs 100a or 100b returns to the free space between the two hulls 402 and is then picked up by the collecting means 408.

Since each of the surface vehicles 400a and 400b also functions as a surface transmitter, two of these surface vehicles 400a and 400b can span a transmission network for a navigation system. For example, the AUV 100b receives the emitted signals (cf. transmitter module 41) from its associated recovery apparatus 400b as well as the signals (cf. transmitter module 41) emitted by the recovery apparatus 400a. To improve the measurement accuracy, the surface vehicles 400a and 400b are ideally spaced at least a few 100 meters apart, with the maximum distance being a few kilometers to minimize multipath signals and reduce the involved sound energy.

The surface vehicles 400a and 400b may be unmanned. In this case, it would be advantageous if the same were equipped with radar reflectors and emit light signals at night to ensure the safety of shipping.

According to an additional embodiment, the selectivity and thus the sensitivity during transmission and reception can be further improved with a lock-in method.

Even if the underwater vehicle was presented above as an autonomous/unmanned underwater vehicle, the underwater navigation system described above can be used for any underwater applications, manned underwater mission, remote-controlled underwater vehicles or as an underwater navigation system for divers.

Even though the above embodiments were explained first and foremost using a device, further embodiments refer to a corresponding method. The same includes the following steps: receiving at least a first signal, wherein the first signal is emitted in a directional manner by a first surface transmitter such that a runtime of the first signal can be determined; determining the runtime of the first signal so as to obtain a conclusion on a first distance to the first surface transmitter; and determining the position of the underwater vehicle in the three-dimensional underwater space in the x-, y- and z-direction based on the known position of the first surface transmitter and on the known first distance; and transmitting a control signal to the first surface transmitter such that the surface transmitter follows the x- and y-direction of the underwater vehicle in the x- and y-direction or such that the first surface transmitter transmits the first signal directed in the direction of the position of the underwater vehicle.

A method for operating the surface transmitter comprises the following steps: receiving position information for the position of the underwater vehicle; and transmitting a first signal such that the first signal is directed in the direction of the position of the underwater vehicle and that a runtime of the first signal can be determined by the underwater vehicle.

In the following, additional embodiments and aspects of the invention will be described which can be used individually or in combination with any of the features and functionalities and details described herein.

According to a first aspect, a surface transmitter 40a, 40b, 40, 40', 40″, 400a, 400b for an underwater vehicle 10; 100a, 100b movable in the three-dimensional underwater space in the x-, y- and z-direction may have: control means 46 for moving the surface transmitter 40a, 40b, 40, 40', 40″, 400a, 400b in the x- and y-direction on the water surface; a receiver 20, 20', 22 for receiving position information for the position of the underwater vehicle 10; 100a, 100b; a control computer 47 for controlling the control means 46, wherein the control computer 47 is configured to control the surface transmitter 40a, 40b, 40, 40', 40″, 400a, 400b such that the surface transmitter 40a, 40b, 40, 40', 40″, 400a, 400b follows the x- and y-direction of the underwater vehicle 10; 100a, 100b in the x- and y-direction.

According to a second aspect when referring back to the first aspect, the control may be performed such that the surface transmitter 40a, 40b, 40, 40', 40″, 400a, 400b is positioned substantially perpendicularly above the underwater vehicle 10; 100a, 100b.

According to a third aspect when referring back to the first or second aspect, the surface transmitter 40a, 40b, 40, 40', 40″, 400a, 400b may have a transmitting apparatus configured to emit a first signal 42, 42*a*, 42*b* such that a runtime of the first signal 42, 42*a*, 42*b* can be determined by the underwater vehicle 10; 100*a*, 100*b*.

According to a fourth aspect when referring back to the third aspect, the transmitting unit may transmit the first signal 42, 42*a*, 42*b* in the direction of the position of the underwater vehicle 10; 100*a*, 100*b* or directed in the direction of the position of the underwater vehicle 10; 100*a*, 100*b*.

According to a fifth aspect, a surface transmitter 40*a*, 40*b*, 40, 40', 40", 400*a*, 400*b* movable in the three-dimensional underwater space in the x-, y- and z-direction may have: a receiver 20, 20', 22 for receiving position information for the position of the underwater vehicle 10; 100*a*, 100*b*; and a transmitting unit that is configured to emit a first signal 42, 42*a*, 42*b* such that a runtime of the first signal 42, 42*a*, 42*b* can be determined by the underwater vehicle 10; 100*a*, 100*b*, wherein the transmitting unit transmits the first signal 42, 42*a*, 42*b* directed in the direction of the position of the underwater vehicle 10; 100*a*, 100*b*.

According to a sixth aspect when referring back to the fifth aspect, the transmitting unit may transmit the first signal 42, 42*a*, 42*b* at a predetermined angle or perpendicularly downward.

According to a seventh aspect when referring back to the sixth aspect, the surface transmitter 40*a*, 40*b*, 40, 40', 40", 400*a*, 400*b* may have control means 46 for moving the surface transmitter 40*a*, 40*b*, 40, 40', 40", 400*a*, 400*b* in the x- and y-direction on the water surface as well as a control computer 47 for controlling the control means 46, wherein the control computer 47 is configured to control the surface transmitter 40*a*, 40*b*, 40, 40', 40", 400*a*, 400*b* such that the surface transmitter 40*a*, 40*b*, 40, 40', 40", 400*a*, 400*b* follows the x- and y-direction of the underwater vehicle 10; 100*a*, 100*b* in the x- and y-direction.

According to an eighth aspect when referring back to any of the fifth to seventh aspects, the transmitting unit may have a horn for directionally emitting the first signal 42, 42*a*, 42*b*.

According to a ninth aspect when referring back to any of the fifth to eighth aspects, the transmitting unit may have a transmitting array for selectively directionally emitting the first signal 42, 42*a*, 42*b* and is configured to control the transmitting array on the basis of the position information so that the same transmits the first signal 42, 42*a*, 42*b* directed to the position of the underwater vehicle 10; 100*a*, 100*b*.

According to a tenth aspect when referring back to any of the fifth to ninth aspects, the transmitting unit may have a movable transmitter for selectively directionally emitting the first signal 42, 42*a*, 42*b* and is configured to control the movable transmitter in its movement on the basis of the position information so that the same transmits the first signal 42, 42*a*, 42*b* directed to the position of the underwater vehicle 10; 100*a*, 100*b*.

According to an eleventh aspect when referring back to any of the firsts to tenth aspects, the surface transmitter 40*a*, 40*b*, 40, 40', 40", 400*a*, 400*b* may have a GNSS antenna.

According to a twelfth aspect when referring back to any of the first to eleventh aspects, the first signal 42, 42*a*, 42*b* may have position information for the position of the surface transmitter 40*a*, 40*b*, 40, 40', 40", 400*a*, 400*b*.

According to a thirteenth aspect when referring back to any of the first to twelfth aspects, the first signal 42, 42*a*, 42*b* may have a time-delay spectrometry signal 42, 42*a*, 42*b* or a ping signal.

According to a fourteenth aspect, a recovery apparatus 400*a*, 400*b* for an underwater vehicle 10; 100*a*, 100*b* may have: collecting means 408 for the underwater vehicle 10;

100*a*, 100*b*; and a surface transmitter 40*a*, 40*b*, 40, 40', 40", 400*a*, 400*b* according to any of the first to thirteenth aspects.

According to a fifteenth aspect, a receiver for an underwater vehicle 10; 100*a*, 100*b* may have: means 20, 20', 22 for receiving at least a first signal 42, 42*a*, 42*b*, wherein the first signal is transmitted in a directional manner by a first surface transmitter 40*a*, 40*b*, 40, 40', 40", 400*a*, 400*b* such that a runtime of the first signal 42, 42*a*, 42*b* can be determined; a signal analysis unit 24 configured to determine the runtime of the first signal 42, 42*a*, 42*b* so as to obtain a conclusion on a first distance to the first surface transmitter 40*a*, 40*b*, 40, 40', 40", 400*a*, 400*b*; and a calculation unit 26 configured to determine, based on known positions of the first surface transmitter 40*a*, 40*b*, 40, 40', 40", 400*a*, 400*b* and on the first distance, the position of the underwater vehicle 10; 100*a*, 100*b* in the three-dimensional underwater space in the x-, y- and z-direction; and a transmitter configured to transmit a control signal to the first surface transmitter 40*a*, 40*b*, 40, 40', 40", 400*a*, 400*b* such that the surface transmitter 40*a*, 40*b*, 40, 40', 40", 400*a*, 400*b* follows the x- and y-direction of the underwater vehicle 10; 100*a*, 100*b* in the x- and y-direction or such that the first surface transmitter 40*a*, 40*b*, 40, 40', 40", 400*a*, 400*b* transmits the first signal 42, 42*a*, 42*b* directed in the direction of the position of the underwater vehicle 10; 100*a*, 100*b*.

According to a sixteenth aspect when referring back to the fifteenth aspect, the control signal may be selected such that the first surface transmitter 40*a*, 40*b*, 40, 40', 40", 400*a*, 400*b* is positioned substantially perpendicularly above the underwater vehicle 10; 100*a*, 100*b*.

According to a seventeenth aspect when referring back to the fifteenth or sixteenth aspect, the means 20, 20', 22 may be configured for receiving a second signal 42, 42*a*, 42*b*, wherein the second signal is emitted in a directional manner from a second surface transmitter 40*a*, 40*b*, 40, 40', 40", 400*a*, 400*b*, such that a runtime of the second signal 42, 42*a*, 42*b* can be determined; wherein the signal analysis unit 24 is configured to determine the runtime of the second signal 42, 42*a*, 42*b* so as to obtain a conclusion on a second distance to the second surface transmitter 40*a*, 40*b*, 40, 40', 40", 400*a*, 400*b*; and wherein the calculation unit 26 is configured to determine, based on the known position of the first surface transmitter 40*a*, 40*b*, 40, 40', 40", 400*a*, 400*b* and on the first distance, the position of the underwater vehicle 10; 100*a*, 100*b*, and based on the known position of the second surface transmitter 40*a*, 40*b*, 40, 40', 40", 400*a*, 400*b* and on the second distance, the position of the underwater vehicle 10; 100*a*, 100*b* in the three-dimensional underwater space in the x-, y- and z-direction.

According to an eighteenth aspect when referring back to the fifteenth, sixteenth or seventeenth aspect, the calculation unit 26 may be configured to determine, based on the known position of the first surface transmitter 40*a*, 40*b*, 40, 40', 40", 400*a*, 400*b* and on the first distance, the position of the underwater vehicle 10; 100*a*, 100*b* and, based on additional information, the position of the underwater vehicle 10; 100*a*, 100*b* in the three-dimensional underwater space in the x-, y- and z-direction.

According to a nineteenth aspect when referring back to the eighteenth aspect, the additional information may have a certain depth of the underwater vehicle or a direction indication with respect to a radiation of the first signal by the surface transmitter 40*a*, 40*b*, 40, 40', 40", 400*a*, 400*b*.

According to a twentieth aspect when referring back to any of the fifteenth to nineteenth aspect, the signal analysis unit 24 may be synchronized with the first surface transmitter 40*a*, 40*b*, 40, 40', 40", 400*a*, 400*b*.

According to a twenty-first aspect when referring back to any of the fifteenth to twentieth aspect, the receiver may have at least one surface transmitter 40*a*, 40*b*, 40, 40', 40", 400*a*, 400*b* according to any of the first to thirteenth aspects or a recovery apparatus 400*a*, 400*b* according to the fourteenth aspect.

According to a twenty-second aspect, a method for position determination of an underwater vehicle 10; 100*a*, 100*b* may have the steps of: receiving at least a first signal 42, 42*a*, 42*b*, wherein the first signal is emitted in a directional manner by a first surface transmitter 40*a*, 40*b*, 40, 40', 40", 400*a*, 400*b*, such that a runtime of the first signal 42, 42*a*, 42*b* can be determined; determining the runtime of the first signal 42, 42*a*, 42*b* so as to obtain a conclusion on a first distance to the first surface transmitter 40*a*, 40*b*, 40, 40', 40", 400*a*, 400*b*; and determining the position of the underwater vehicle 10; 100*a*, 100*b* in the three-dimensional underwater space in the x-, y- and z-direction based on the known position of the first surface transmitter 40*a*, 40*b*, 40, 40', 40", 400*a*, 400*b* and on the known first distance; and transmitting a control signal to the first surface transmitter 40*a*, 40*b*, 40, 40', 40", 400*a*, 400*b* such that the surface transmitter 40*a*, 40*b*, 40, 40', 40", 400*a*, 400*b* follows the x- and y-direction of the underwater vehicle 10; 100*a*, 100*b* in the x- and y-direction or such that the first surface transmitter 40*a*, 40*b*, 40, 40', 40", 400*a*, 400*b* transmits the first signal 42, 42*a*, 42*b* directed in the direction of the position of the underwater vehicle 10; 100*a*, 100*b*.

According to a twenty-third aspect, a method for controlling a surface transmitter 40*a*, 40*b*, 40, 40', 40", 400*a*, 400*b* comprising control means 46 configured for moving the surface transmitter 40*a*, 40*b*, 40, 40', 40", 400*a*, 400*b* in the x- and y-direction on the water surface may have the steps of: receiving position information for the position of an underwater vehicle 10; 100*a*, 100*b* movable in the three-dimensional underwater space in the x-, y- and z-direction; and controlling the control means 46 of the surface transmitter 40*a*, 40*b*, 40, 40', 40", 400*a*, 400*b* such that the surface transmitter 40*a*, 40*b*, 40, 40', 40", 400*a*, 400*b* follows the x- and y-direction of the underwater vehicle 10; 100*a*, 100*b* in the x- and y-direction.

According to a twenty-fourth aspect, a method for operating a surface transmitter 40*a*, 40*b*, 40, 40', 40", 400*a*, 400*b* for an underwater vehicle 10; 100*a*, 100*b* movable in the three-dimensional underwater space in the x-, y- and z-direction may have the steps of: receiving position information for the position of the underwater vehicle 10; 100*a*, 100*b*; and emitting a first signal 42, 42*a*, 42*b* such that the first signal 42, 42*a*, 42*b* is directed in the direction of the position of the underwater vehicle 10; 100*a*, 100*b* and that a runtime of the first signal 42, 42*a*, 42*b* can be determined by the underwater vehicle 10; 100*a*, 100*b*.

According to a twenty-fifth aspect, a computer program may have program code for performing a method according to the twenty-second, twenty-third or twenty-fourth aspect.

According to a twenty-sixth aspect, a surface transmitter 40*a*, 40*b*, 40, 40', 40", 400*a*, 400*b* for an underwater vehicle 10; 100*a*, 100*b* movable in the three-dimensional underwater space in the x-, y- and z-direction may have: control means 46 for moving the surface transmitter 40*a*, 40*b*, 40, 40', 40", 400*a*, 400*b* in the x- and y-direction on the water surface; a receiver 20, 20', 22 for receiving position information for the position of the underwater vehicle 10; 100*a*, 100*b*; a control computer 47 for controlling the control means 46, wherein the control computer 47 is configured to control the surface transmitter 40*a*, 40*b*, 40, 40', 40", 400*a*, 400*b* such that the surface transmitter 40*a*, 40*b*, 40, 40', 40", 400*a*, 400*b* follows the x- and y-direction of the underwater vehicle 10; 100*a*, 100*b* in the x- and y-direction, wherein the surface transmitter 40*a*, 40*b*, 40, 40', 40", 400*a*, 400*b* comprises a transmitting apparatus configured to emit a first signal 42, 42*a*, 42*b* such that a runtime of the first signal 42, 42*a*, 42*b* can be determined by the underwater vehicle 10; 100*a*, 100*b*; wherein the control is performed such that the surface transmitter 40*a*, 40*b*, 40, 40', 40", 400*a*, 400*b* is positioned substantially perpendicularly above the underwater vehicle 10; 100*a*, 100*b* to emit the first signal 42, 42*a*, 42*b* substantially perpendicularly in the direction of the position of the underwater vehicle 10; 100*a*, 100*b*; or wherein the transmitting unit transmits the first signal 42, 42*a*, 42*b* directed in the direction of the position of the underwater vehicle 10; 100*a*, 100*b*.

According to a twenty-seventh aspect, a method for controlling a surface transmitter 40*a*, 40*b*, 40, 40', 40", 400*a*, 400*b* with control means 46 configured for moving the surface transmitter 40*a*, 40*b*, 40, 40', 40", 400*a*, 400*b* in the x- and y-direction on the water surface may have the steps of: transmitting a first signal 42, 42*a*, 42*b* such that the first signal 42, 42*a*, 42*b* is directed in the direction of the position of the underwater vehicle 10; 100*a*, 100*b* and that a runtime of the first signal 42, 42*a*, 42*b* can be determined by the underwater vehicle 10; 100*a*, 100*b*; receiving position information for the position of an underwater vehicle 10; 100*a*, 100*b* movable in the three-dimensional underwater space in the x-, y- and z-direction; and controlling the control means 46 of the surface transmitter 40*a*, 40*b*, 40, 40', 40", 400*a*, 400*b* such that the surface transmitter 40*a*, 40*b*, 40, 40', 40", 400*a*, 400*b* follows the x- and y-direction of the underwater vehicle 10; 100*a*, 100*b* in the x- and y-direction, wherein the control is performed such that the surface transmitter 40*a*, 40*b*, 40, 40', 40", 400*a*, 400*b* is positioned substantially perpendicularly above the underwater vehicle 10; 100*a*, 100*b* to emit the first signal 42, 42*a*, 42*b* substantially perpendicularly in the direction of the position of the underwater vehicle 10; 100*a*, 100*b*; or wherein transmitting the first signal 42, 42*a*, 42*b* is performed directed in the direction of the position of the underwater vehicle 10; 100*a*, 100*b*.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or configured to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A surface transmitter movable in a three-dimensional underwater space in the x-, y- and z-direction, comprising:
   a receiver for receiving position information for position of an underwater vehicle; and
   a transmitting unit that is configured to emit a first signal such that a runtime of the first signal can be determined by the underwater vehicle so as to determine a relative position information or distance information of the underwater vehicle with respect to the surface transmitter; wherein the first signal comprises position information for an absolute position of the surface transmitter, wherein the transmitting unit transmits the first signal directed in the direction of the position of the underwater vehicle;
   wherein the transmitting unit transmits the first signal at a predetermined angle or perpendicularly downward; and
   wherein the surface transmitter comprises a controller for moving the surface transmitter in the x- and y-direction on a water surface as well as a control computer for controlling the controller, wherein the control computer is configured to control the surface transmitter such that the surface transmitter follows the x- and y-direction of the underwater vehicle in the x- and y-direction.

2. The surface transmitter according to claim 1, wherein the transmitting unit comprises a horn for directionally emitting the first signal.

3. The surface transmitter according to claim 1 wherein the transmitting unit comprises a transmitter array for selectively directionally emitting the first signal and is configured to control the transmitter array on the basis of the position information so that the same transmits the first signal directed to the position of the underwater vehicle.

4. The surface transmitter according to claim 1, wherein the transmitting unit comprises a movable transmitter for selectively directionally emitting the first signal and is configured to control the movable transmitter in its movement on the basis of the position information so that the same transmits the first signal directed to the position of the underwater vehicle.

5. The surface transmitter according to claim 1, wherein the surface transmitter comprises a GNSS antenna.

6. The surface transmitter according to claim 1, wherein the first signal comprises a time-delay spectrometry signal.

* * * * *